United States Patent
Shulman et al.

(10) Patent No.: US 8,295,644 B2
(45) Date of Patent: Oct. 23, 2012

(54) BIRDS EYE VIEW VIRTUAL IMAGING FOR REAL TIME COMPOSITED WIDE FIELD OF VIEW

(75) Inventors: Alan Shulman, Santa Rosa, CA (US); Donald R. Snyder, III, Crestview, FL (US)

(73) Assignee: Doubleshot, Inc., Santa Rosa, CA (US)

( * ) Notice: Subject to any disclaimer, the term of this patent is extended or adjusted under 35 U.S.C. 154(b) by 0 days.

(21) Appl. No.: 12/259,227

(22) Filed: Oct. 27, 2008

(65) Prior Publication Data
US 2009/0092334 A1 Apr. 9, 2009

Related U.S. Application Data

(63) Continuation of application No. 10/914,375, filed on Aug. 9, 2004, now abandoned.

(60) Provisional application No. 60/493,579, filed on Aug. 9, 2003.

(51) Int. Cl.
*G06K 9/32* (2006.01)

(52) U.S. Cl. ........ 382/298; 382/100; 382/104; 382/154; 382/293; 382/294; 382/295; 382/302; 348/42; 348/47

(58) Field of Classification Search ................. 382/100, 382/104, 154, 293–295, 302, 298; 348/42, 348/47
See application file for complete search history.

(56) References Cited

U.S. PATENT DOCUMENTS

| | | | | |
|---|---|---|---|---|
| 5,420,940 | A * | 5/1995 | Sedlar et al. | 382/276 |
| 5,587,929 | A * | 12/1996 | League et al. | 342/159 |
| 6,141,014 | A * | 10/2000 | Endo et al. | 345/427 |
| 6,172,601 | B1 * | 1/2001 | Wada et al. | 340/436 |
| 6,344,805 | B1 * | 2/2002 | Yasui et al. | 340/932.2 |
| 6,396,535 | B1 * | 5/2002 | Waters | 348/159 |
| 6,912,001 | B2 * | 6/2005 | Okamoto et al. | 348/222.1 |
| 6,958,770 | B2 * | 10/2005 | Okada et al. | 348/149 |
| 7,065,261 | B1 * | 6/2006 | Horie | 382/289 |
| 7,123,748 | B2 * | 10/2006 | Oizumi | 382/104 |
| 7,295,229 | B2 * | 11/2007 | Kumata et al. | 348/148 |
| 7,307,655 | B1 * | 12/2007 | Okamoto et al. | 348/222.1 |
| 7,502,048 | B2 * | 3/2009 | Okamoto et al. | 348/148 |
| 2002/0034316 | A1 * | 3/2002 | Ishii et al. | 382/104 |
| 2002/0181803 | A1 * | 12/2002 | Kawakami et al. | 382/293 |
| 2002/0196340 | A1 * | 12/2002 | Kato et al. | 348/148 |
| 2003/0044081 | A1 * | 3/2003 | Uesugi | 382/276 |
| 2003/0085999 | A1 * | 5/2003 | Okamoto et al. | 348/148 |
| 2003/0165255 | A1 * | 9/2003 | Yanagawa et al. | 382/104 |

FOREIGN PATENT DOCUMENTS
JP 2002373327 * 12/2002

* cited by examiner

*Primary Examiner* — Jayesh A Patel
(74) *Attorney, Agent, or Firm* — Finnegan, Henderson, Farabow, Garrett & Dunner LLP

(57) ABSTRACT

A live image and a previously acquired or generated image are superimposed or composited to represented a virtual vantage point for flying, driving or navigating a plane, vehicle or vessel.

18 Claims, 6 Drawing Sheets

BIRDS EYE VIEW VIRTUAL IMAGING FOR REAL TIME COMPOSITED WIDE FIELD OF VIEW

RELATED APPLICATIONS

This application is a continuation of application Ser. No. 10/914,375, filed Aug. 9, 2004, now abandoned entitled BIRDS EYE VIEW VIRTUAL IMAGING FOR REAL TIME COMPOSITED WIDE FIELD OF VIEW, which claims priority to Provisional Application Ser. No. 60/493,579, filed Aug. 9, 2003, both of which are incorporated herein by reference.

TECHNICAL FIELD

The present invention relates to methods of acquiring multiple images for display in the form of a composite image from alternative vantage points, and more particularly to the use of such methods for steering transportation vehicles to real-time or providing situational awareness.

BACKGROUND OF THE INVENTION

The present invention recognizes certain limitations which inherently exist in an attempt to navigate a vehicle. Often times, vehicles provide a driver with a limited view of the driver's surroundings. For example, large trucks and military vehicles such as a tanks position a driver high above a roadway with a somewhat limited viewing angle. By the time potholes and other impediments are closely approached by the vehicle, they are no longer in a driver's field of view. As such, an attempt was made to suggest a means of providing a driver both with obstacle positioning and coordinance together with a broader view of the vehicle's upcoming terrain. To the inventor's understanding, there has been no successful means suggested to date for providing such useful information to a vehicle operator.

SUMMARY OF THE INVENTION

A first object of the instant invention is to display a virtual image to an individual steering or driving a plane, vessel or transportation vehicle in real time, or other visualization requirement when the image comprising a live image is suitably transformed to reflect a vantage point reflecting the position of the vehicle in reference to obstacles and hazards that are no longer in view.

Yet another object of the present invention is to display virtual imaging that combines visual and non-visual imaging sensors in real-time.

It is yet another object of the present invention is to combine live images acquired by multiple vehicles to form composite images reflecting a wider virtual field of view, the field of view optionally combining using previously acquired or generated images superimposed thereon.

A further object of the invention is to superimpose reference information on the aforementioned composite images illustrating, for example, the relative position of the vehicle, hazards, targets and the desired path or roadway between such objects.

One aspect of the invention is characterized in that images acquired at times t1 and t2 are optionally superimposed or composited by correlating the relative magnification such that pixels from the distant image are placed with the corresponding pixels of the live image. However, to the extent that the virtual viewpoint is intended to enable navigation around objects that are no longer visible to the live image, this superposition is preferably continuously updated to account for both forward movement and rotation (X, Y, Z) of the image frames.

The above and other objects, effects, features, and advantages of the present invention will become more apparent from the following description of the embodiments thereof taken in conjunction with the accompanying drawings.

DETAILED DESCRIPTION OF THE INVENTION

Figure 1:
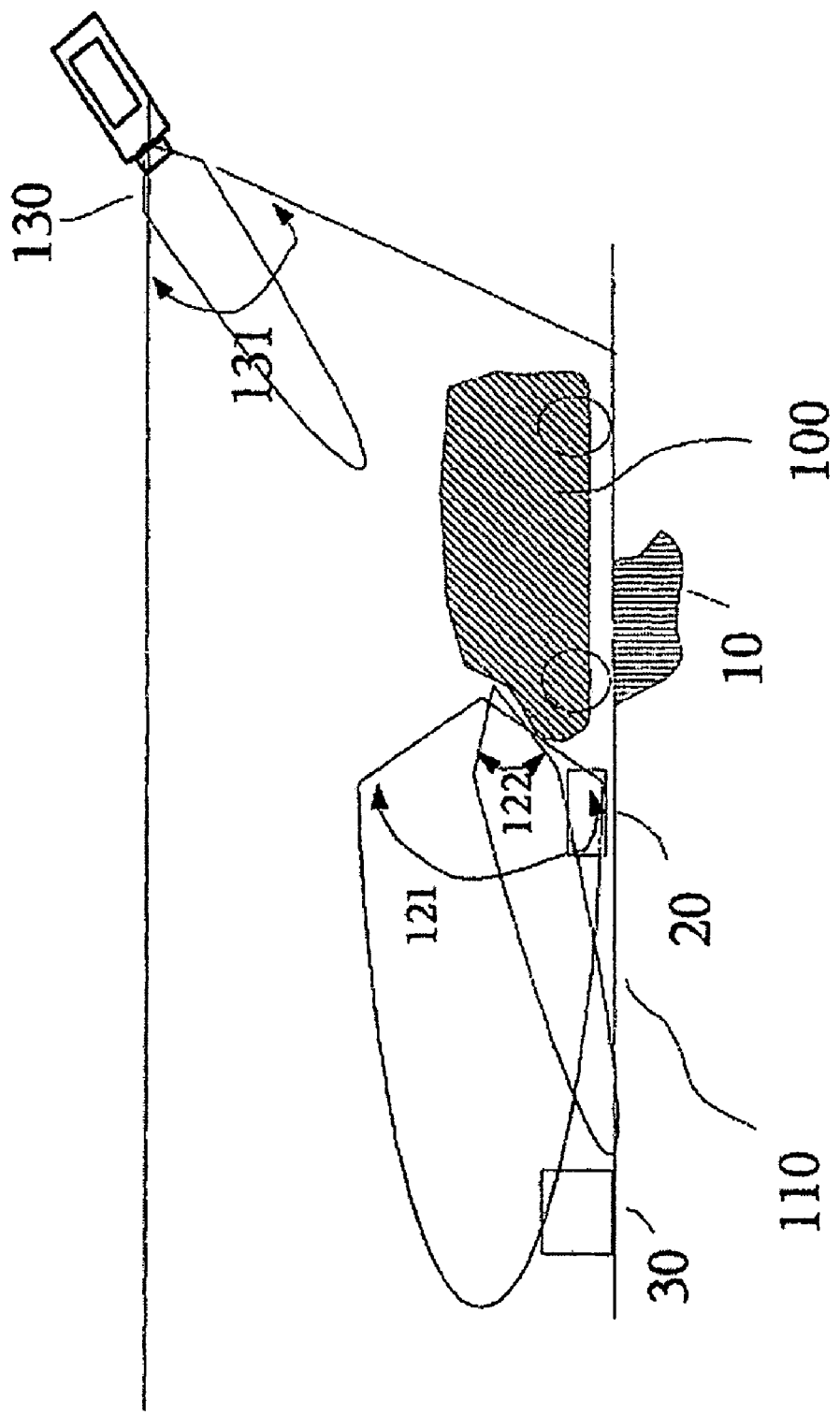
In FIG. 1 the elevation of a vehicle, traveling on the road is intended to schematically illustrate the driver's actual viewpoint and the preferred viewpoint according to the teachings of the instant invention.

FIG. 1 is an elevation view to illustrate the deficiencies of the vantage point of a driver in vehicle 100. Objects having reference numerals 10, 20 and 30 represent normally visible obstacles in or adjacent to the road 110. More specifically, the driver has just passed by pothole 10, which is no longer visible from the front window, whereas the farthest obstacles 30 are still within the field of view, being subtended by angle 121 to represent the driver's vantage point. However, as object 20 is about to leave the driver's field of view as the vehicle progresses forward, it is very difficult to pass such road obstacles at a close distance, or drive between them as the spacing approaches the width of the vehicle. Thus, to the extent a road, bridge or rough terrain is extremely narrow with obstacles or borders that represent significant safety hazards, or the driver is required to navigate in close proximity to such hazards, the disappearance at close range from the driver's field of vision is undesirable. Further, to the extent the navigation vehicle depends on non-visual imaging system, for instance an infrared imaging system for use during night driving or fog, the viewing angle of such imaging systems, represented by reference numerals 122, can be a further limitation. Under these and other conditions it would be preferable if the driver could simultaneously have a sufficiently distant view in front of the vehicle, while at the same time perceive the vehicles position with respect to close objects and hazards they are attempting or forced to avoid at a close distance.

More specifically, in particularly hazardous situations it would be desirable if the driver could control the vehicle with a virtual viewpoint situated slightly behind a vehicle, as indicated by the camera icon 130, having a virtual viewing area within the arc subtended by angle 131. Thus, a display of the virtual viewing angle shows the driver the vehicle location with respect to road hazards 10, 20 and 30, which might be located either just in front or to either side of the vehicle.

Figure 2:
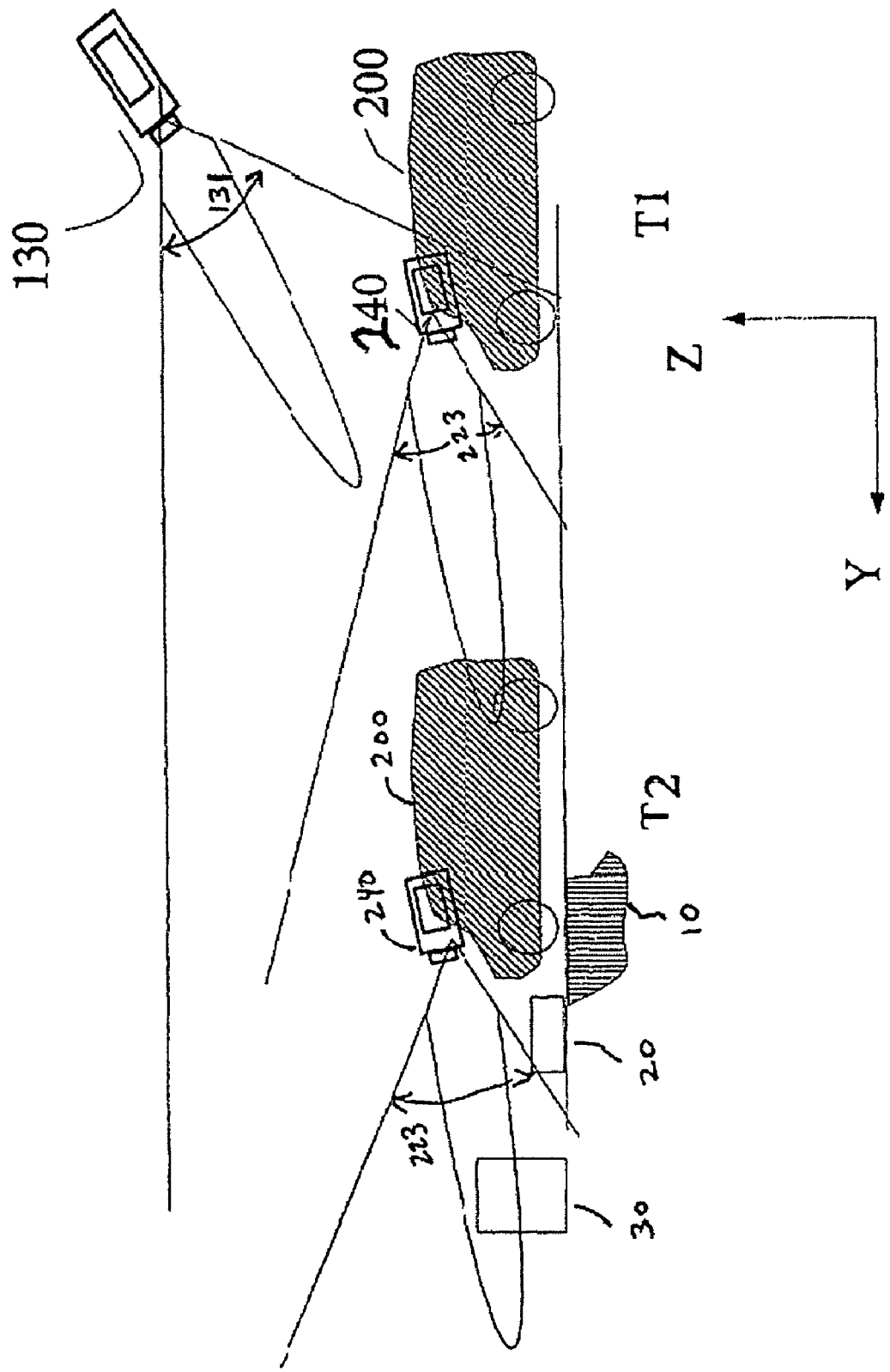
FIG. 2 is an elevation showing the principal of acquiring and utilizing time sequence images corresponding to a vehicle's first position at time t 1 and second position at t 2 while traveling on the road depicted in FIG. 1.

Accordingly, FIG. 2 illustrates the operative principles for a first embodiment of the instant invention, which includes acquiring and displaying the desirable image of virtual camera 130 of FIG. 1. Vehicle 200 in FIG. 2 includes a video or digital imaging camera 240 that continually acquires at least a forward image as vehicle 200 progresses from the right side of the Figure at time t1 to the left side of the Figure at time t2. Camera 240 has an actual viewing area within the arc subtended by angle 223, which may be the same, narrower or wider than the driver's actual field of view. Two or more images acquired by camera 240 between t1 and t 2 are used to generate a composite, for example, an actual image acquired at time t2 as if acquired from virtual camera position 130, but overlaid in correspondence with image data acquired at time t1. Thus, the driver would be able to view and steer around or close to the edge of the road but avoid hazards 10, 20 and 30.

Figure 3:
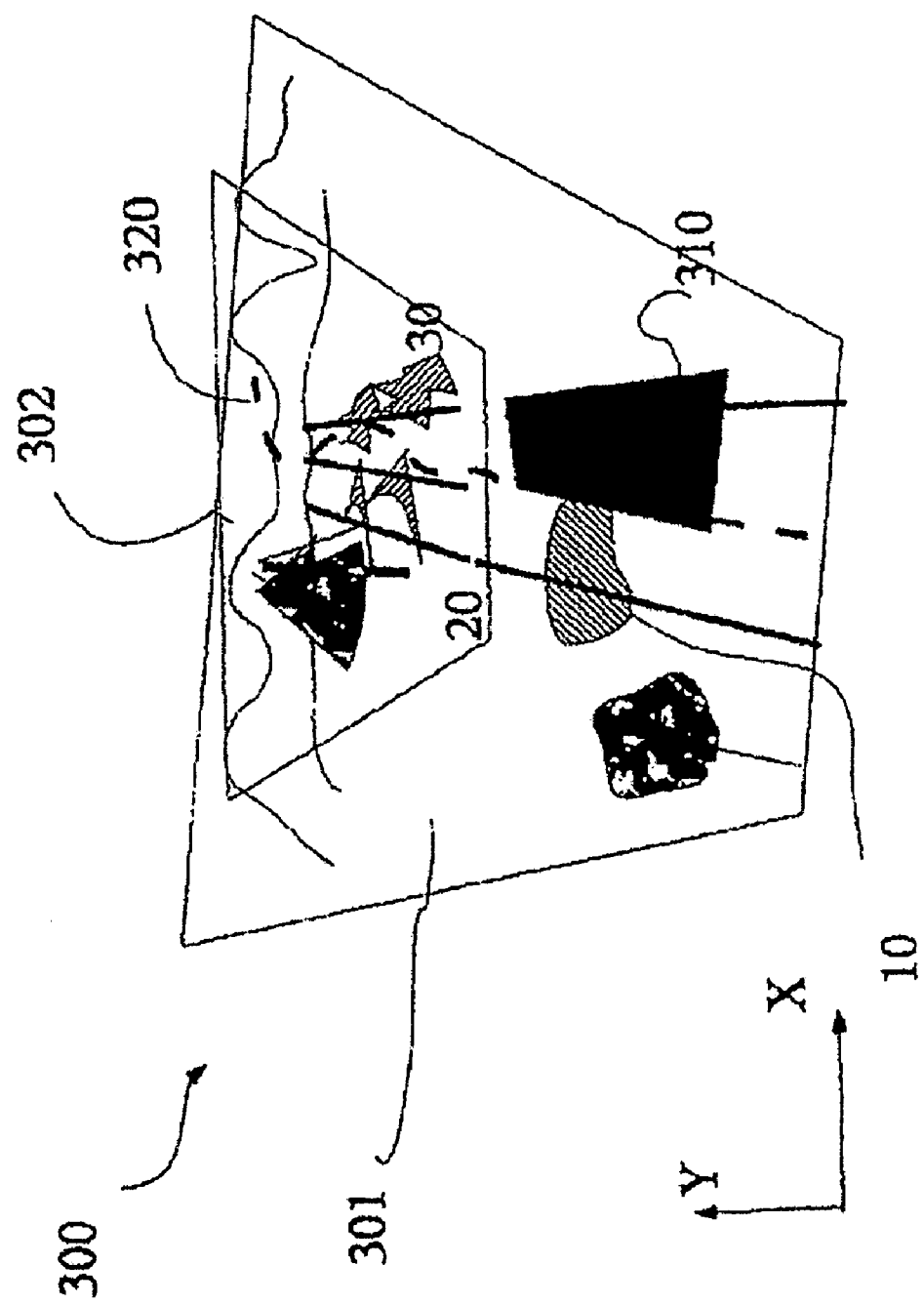
FIG. 3 is an illustration from the preferred viewpoint of a vehicle in its actual position as displayed to the driver of the vehicle.

Accordingly, FIG. 3 illustrates a display 300 of the driver's view of composite image corresponding to time t2, as would be seen from virtual camera position 130. The display 300 has a first frame region 302 and a surrounding region 301. The first or inner frame region 302 preferably is used to display the current, or live image accorded time t2, whereas the surrounding region 301 was acquired earlier, that is at time t1, or between time t2 and time t1, and thus includes pothole 10, which is adjacent to vehicle, and out of the driver's current actual view. The image of the vehicle 310 is synthesized, as it is never in actual view. In yet another embodiment, Display 300 may also include various indicia, such as a guideline 320 to follow to drive between other hazard objects 20 and 30.

It should be appreciated that since it is very difficult to position a camera for recording images that correspond with the virtual camera 130 position each of the images acquired at time t1 and time t2 are generally transformed prior to display of the composite image representing the virtual viewpoint at time t2. However, the image at time t1 in the above example can be generated from another image source not on the vehicle, including an image database, and may in fact have been acquired at the reference viewpoint.

Generating the Bird's-Eye View (BEV) image of FIG. 3 utilizes one or more images acquired at a different viewpoint, which are transformed to reflect a different vantage point above vehicle. Those of ordinary skill in the art of computer graphics will recognize that there are numerous schemes for performing such transformations. Aerial video is rapidly emerging as a low cost, widely used source of imagery for mapping, surveillance and monitoring applications. The disclosure of U.S. Pat. No. 5,259,037, which is incorporated herein by reference, discloses a method of acquiring individual images from an aerial video that can be aligned with one another and merged to fonn an image mosaic. In surveillance applications, such a video map provides the basis for estimating motion of objects within a scene. U.S. Pat. No. 5,590,037, which is incorporated herein by reference, discloses a method for converting forward-looking video or 4 motion picture imagery into a down looking database suitable for use in an image generation system to generate real-time perspective images for simulation purposes.

Further, U.S. Pat. No. 5,649,032, which is incorporated herein by reference, discloses methods for automatically generating a mosaic from a plurality of input images. The inventor's of the '032 patent teach a mosaic construction system that sequentially executes an image alignment process and a mosaic composition process such that, from a sequence of images, the system automatically produces a mosaic for utilization by various applications. The invention is described as being capable of constructing both dynamic and static mosaics. A dynamic mosaic includes imagery that is time variant, e.g., the mosaic is updated with new content over time, while the content of a static mosaic is time invariant.

U.S. Pat. No. 6,512,857, which is incorporated herein by reference, discloses a system and method for accurately mapping between camera coordinates and geocoordinates, called geo-spatial registration. The method utilizes the imagery and terrain information contained in the geo-spatial database to precisely align the reference imagery with input imagery, such as dynamically generated video images or video mosaics, and thus achieve a high accuracy identification of locations within the scene. The geo-spatial reference database generally contains a substantial amount of reference imagery as well as scene annotation information and object identification information. When a sensor, such as a video camera, images a scene contained in the geo-spatial database, the system recalls a reference image pertaining to the imaged scene. This reference image is aligned very accurately with the sensor's images using a parametric transformation. Thereafter, other information (annotation, sound, and the like) that is associated with the reference image can easily be overlaid upon or otherwise associated with the sensor imagery. Applications of geo-spatial registration include text/graphical/audio annotations of objects of interest in the current video using the stored annotations in the reference database to augment and add meaning to the current video.

Figure 4:
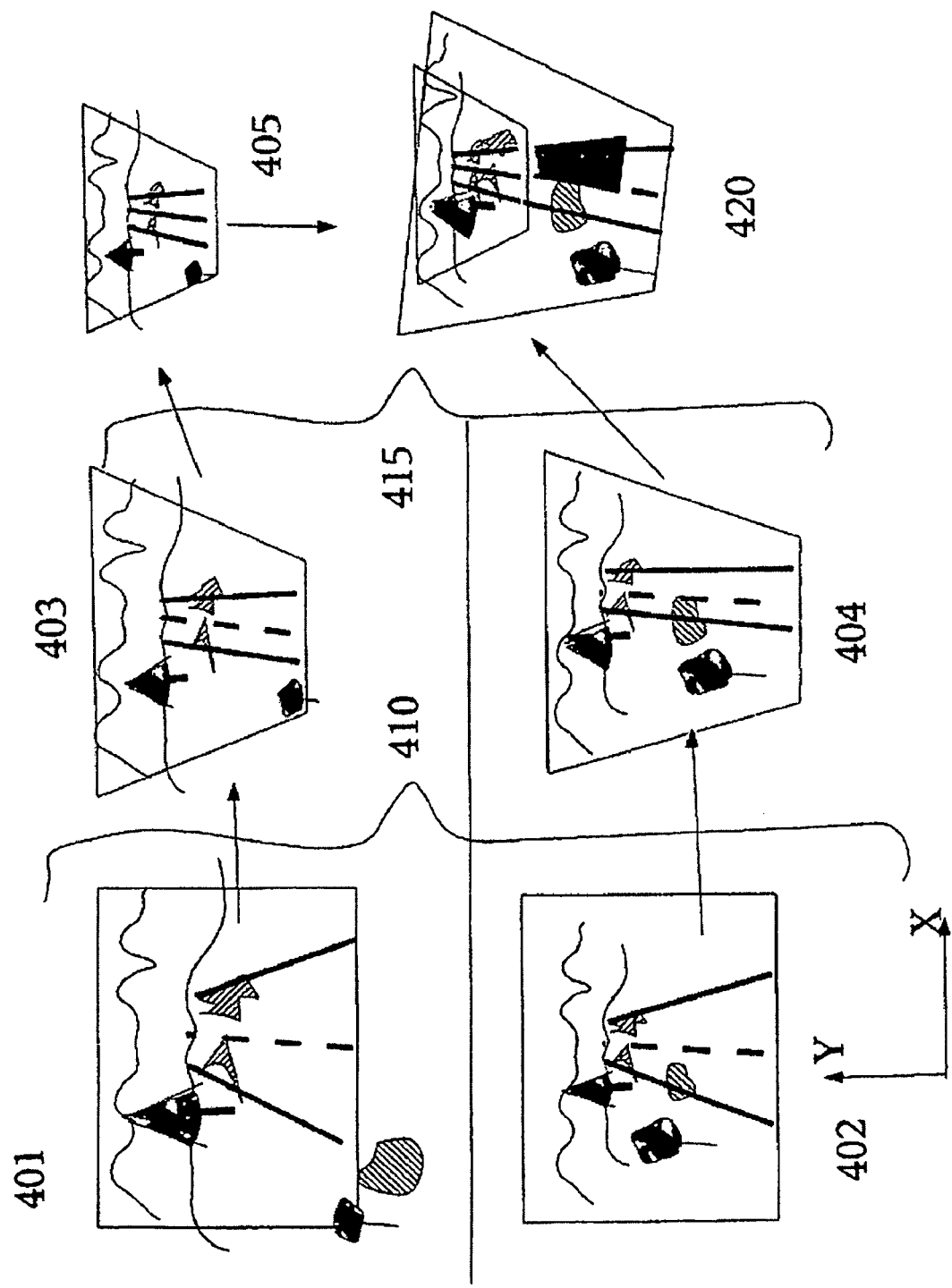
FIG. 4 is a schematic diagram illustrating the principles underlying one embodiment of a method of image processing to transform the images to an equivalent virtual view point above and behind the vehicle at the same magnification, including discrete steps in transforming, aligning and superimposing a real-time image with a corresponding synthetic image.

Commercial software is available for performing the manipulations disclosed in FIG. 4, or alternative methods of combining adjacent images having some overlap, known as "mosaic tiling" may be deployed. For example, Observera Inc. of 4451 Brookfield Corporate Drive, Suite 107, Chantilly, Va. 20151-1693 provides software that has a range of features allowing modification to serve a variety of applications. In addition, Sarnoff Corporation and Pyramid Vision Technologies, both of 201 Washington Road, CN 5300 Princeton, N.J. 08543-5300, supply commercial software and hardware for performing Birds-Eye-View transformations to create fly by images.

The methods for generating the useful displayed image in FIG. 3 can be deconstructed into a sequence of steps, although they need not all occur in a discrete manner, depending on the method of implementation. Thus, FIG. 4 illustrates one embodiment of operative principles for acquiring, transforming and aligning the image data used to generate the real-time display of FIG. 3. Accordingly, the following description should not be construed as limiting the scope of the patent.

FIG. 4 illustrates an alternative embodiment for generating display 300. Image 402 is acquired at time t1, whereas image 401 is acquired a time t2, accordingly the pair of images represented by bracket 410 correspond to live actual images recorded for the moving vehicle. In process of generating image 420 for display, the first image frame 402 is acquired in either video or digital format. Then after movement or displacement of the camera on the vehicle, a second or live image 401 is similarly acquired. Bracket 410 contains a digital representation of the actual images acquired at time t1 and t2 for further transformation and merger to form a composite image 420. Although the BEV can be created before or after merger of images 403 and 404, the images in bracket 415 represent BEV transformations of the corresponding adjacent images within bracket 410. The rectangular image frames in bracket 410 are distorted to trapezoidal shapes in generating the higher elevation or BEV. One embodiment for generating such bird's eye view images optionally includes performing scaled transformation of the rectangular image frame to a trapezoid to simulate the loss of prospective as the BEV virtual viewpoint increases in azimuth angle from the actual viewpoint of the camera mounted on the vehicle. The trapezoid results from transforming each row of the x-axis gradually with increased compression starting from the upper edge of the picture frame of the actual view 410, with increasing compression towards the bottom of the frame. As shown in image 403, a trapezoidal transformation decreases the divergence of the lines representing the highway traffic lanes in the images of bracket 410.

Although image 401 is preferably modified by digital processing to image 403 to correspond to the expected appearance from virtual viewpoint position 130 in FIG. 2, alternative viewpoints are possible, including a position forward of the vehicle at the time t2 at which image 401 is recorded, provided images 403 and 404 are generated with substantially the same virtual viewpoint position.

Once the transformed image 403 and 404 are generated, the near 401 image acquired at time t2 is appropriately scaled and overlapped with respect to the earlier acquired image 402. Thus in forming the composite image 420, the scaling factor to convert image 403 to image 405 must be determined, as well as any x and y displacement for overlay of image 405 on image 404.

Further, virtual features, such as the image of the vehicle, frame separating the image regions, optional projection of any intended driving path, and the like, are preferably overlaid on the penultimate composite images to form the final composite image 420. Further, the composite image is most preferably refreshed in real time to reflect the forward progress of the vehicle. Thus, image 405 is represented as de-magnified from image 403 to represent its scaling prior to merger over virtual image 404 to create display image 420. However, equivalent operations can be performed on image 401, such that detail in the real time image is more fully preserved.

The displayed image 420 is optionally generated by merging de-magnified image 405 with image 404, taking into account lateral translation and rotation of the actual cameras viewpoint between the acquisition of frames 402 at time t1 and 401 at time t2. The overlay can be determined by mapping the displacement of pixels from image frames 405 to 404, such that a selected sub group of pixels in image 404 is replaced with image frame 405 pixels prior to display. As the image acquired at time t1 and t2 are mapped to the same magnification, a relative movement or rotation is optionally determined by first searching each image field to identify high contrast features, and then comparing the relative orientation of these features to generate the appropriate correction factors. That is, when the correction factors are applied the high contrast features must coincide to compose an accurate virtual image for display.

Image 403 is scaled to generate image 405 by a de-magnification factor based on Y-axis displacement of the vehicle between image frames 401 and 402 (See FIG. 2). The factor used to generate image 405 from image 403 can be determined by several alternative methods. Thus, depending on the method of forming and generating the composite image 420, it is desirable to know the absolute movement of the actual camera position between times t1 and t2, as this determines the scaling factor for converting image 403 to 405 by geometric calculations, or magnifying images 404 with respect to 403. The Y-axis distance can determined by several methods, including but not limited to global satellite positioning, or calculating the change in position by integrating the speedometer output over time to synchronize the time period between t1 and t2 (See FIG. 2).

To the extent that the initial images are readily acquired in digital format by converting an analog video feed into an JPEG or MPEG format data stream, the correction factors can be generated from selected parameters of the digital data streams. Briefly, JPEG and MPEG data format transmits full images, or I frames, infrequently to conserve bandwidth, using a sequence of intervening frames (B and P type in MPEG) to communicate the changes to portions of the image between I frames. In forming the MPEG/JPEG data stream the image is broken down into macro blocks, which is collections of pixels, and analyzed to identify macro blocks that change location between successive image frames, which are then used to reconstruct the full image for final display. In the MPEG format both B and P frames identify and track macro blocks that change location between I frames. Specifically, the translation and rotation of image 404 with respect image 405 necessary for merging these images may be determined from the movement of macro block represented in the JPEG and MPEG formats by extracting an average macro block translation to represent the relative movement between consecutive I frames. Thus, the vector sum of the individual translation factors can be applied to align images 404 and 405. To the extent rotation and translation have been limited, the magnification factor is alternatively computed from the y-axis components of the macro block translation between I frames.

It should be appreciated by one of ordinary skill in the art that the position of car 310 in FIG. 3 is synthetically generated based on the data set representing the actual car's dimensions, and the selection of the birds eye view position, that is, Z, Y position in FIG. 1. For example by specifying two or more parameters which may include, the azimuth angle, vertical height above the vehicle, horizontal distance behind the vehicle (at time t2), viewing angle and like parameters define the Z and Y positions necessary to determine the appropriate transformation factors used to generate the pair transformed images in bracket 415 from the corresponding actual images in bracket 410 in FIG. 4.

In another alternative embodiment, MPEG conversion can be limited to images 401 and 402, rather than the entire video frame sequence thus simplifying the computational complexity. However, in a preferred embodiment, the entire bit stream representing each individual frame recorded by the video camera between images 401 and 402 is utilized.

Further, in yet another embodiment, the aforementioned method of macro block tracking can be extended to determine the factor used to compute the magnification of image 403 for generating image 405 while simultaneously correcting for what has been initially described as discrete steps of image rotation and translations determination, i.e. the steps used to place image 405 in image 404. Although it may be possible in some instances to identify one or more macro blocks that correspond to distinct objects or edges of the vision field, it is unlikely that the same macro blocks can be uniquely identified for each frame of the video source from t1 to t2. However, this is not necessary, provided a refreshed or updated subset of macro blocks is used at each I-frame. The updated subset would correspond to the same x-y coordinate range of the macro blocks in the previous I frame, as updated to reflect the most recent preceding image. More specifically, using the MPEG bit stream to trace the displacement of macro blocks at corners of image frame 401 includes correction for magnification, translation and rotation. Reverse tracking the relative positions of macro blocks that correspond to the corner regions of frame 401 define a relative position for edges of the frame acquired at time t1 with respect to the frame acquired at time t2. Thus applying a linear scaling between the compression and distortion ratios necessary to re-map the frame corner also accomplishes translation and rotation. It is anticipated that either of frames 402 or 401 can be modified, either before or after the trapezoidal distortion, that represents the BEV. Alternatively, if the distance traversed between image frames 401 and 402 is significant, or the bit stream has been interrupted, the magnification factor can also be determined by computation from the integrated speedometer readings. Alternatively, larger gaps can also be accommodated by calculation based on the GPS coordinates recorded at the time of acquisition for images 401 and 402.

Alternatively, if the driver is concerned about a particular image feature or region of the live image, the translation and rotation factors are preferably acquired by selecting the corresponding macro blocks that represent such features. The previous calculation, likewise carried out by starting with the last live frame 401, may be carried out by averaging (before accumulating the sum thereof) a limited number of macro block translation factors depending on the area selected. Although the identical macro blocks used as the starting point for the reverse computation (from a particular region of the live image 401 may only maintain the same identity between I Frames in the MPEG bit stream, the accuracy is then likely to be improved by selecting a newer subset of macro blocks that correspond to the same x-y coordinate range of the macro blocks in the previous I frame.

Thus, the steps in executing the aforementioned method of macro block tracking include; 1) identifying the first set of nearest neighbor macro blocks corresponding to corners of frame 401 or selected portions of the live image, 2) recording the average translation to the previous I frame, 3) recording the average x-y coordinate position corresponding to average translation to previous I frame, 4) identifying a second set of nearest neighbor macro blocks corresponding to average x-y coordinate positions, 5) recording the average translation to the next previous I frame, 6) compute the sum of the first average translation and each subsequent average translation for each of the corresponding four corners of frame 401 (or selected regions therein), 7) repeating the previous steps of identifying the second set of nearest neighbors until the subsequent I frame corresponds to the closest I frame from image frame 401, 8) linearly distorting one of image frame 401 to 402 to align the corresponding corners according to their respective translation factors, 9) either before or after merging the distorted and undistorted image frame from the previous step generating a second composite image by distorting a first composite image to correspond with the position of the virtual viewpoint, 10) calculating a second pixel subset corresponding to the profile of the vehicle as determined by the position of the virtual viewpoint, 11) replacing selected pixels in the second composite image with the second subset of pixels to form a third composite image, and 12) displaying the third composite image.

Figure 5:
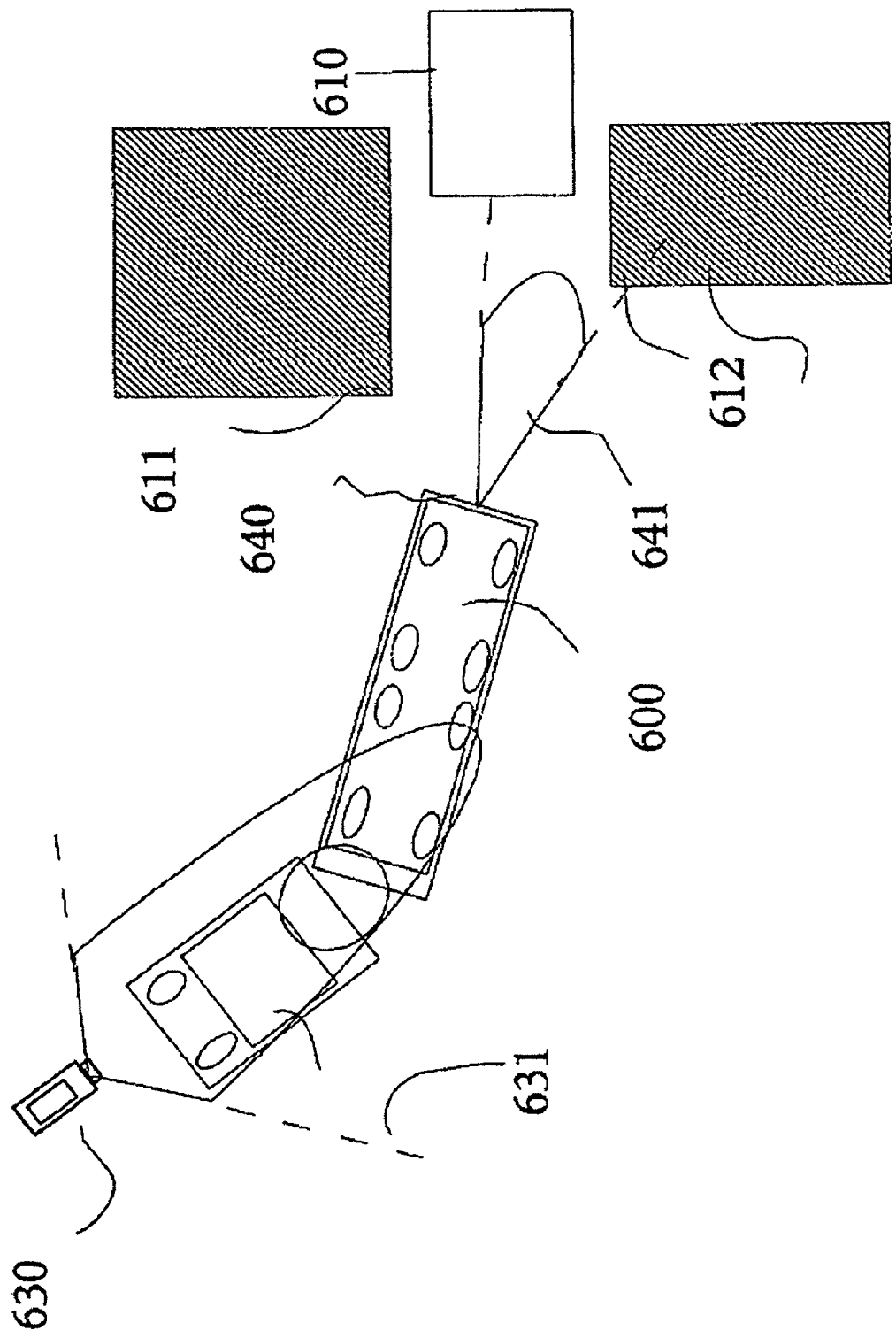
FIG. 5 is a plain view illustrating the use of the instant invention for assisting a truck driver to backup a truck rig into a loading ramp.

FIG. 5 is a plain view illustrating the use of the instant invention for assisting a truck driver to backup a truck rig 600 into a loading ramp 610. The driver views a display that provides a composite of a live and recorded image from camera 640 (with viewing angle 641) according to the teachings of the invention with virtual camera position 630 (having viewing angle 631) such that the drivers "sees" the corners or other obstacles 611 and 612 in close proximity as they back up the truck to the loading dock.

Figure 6:
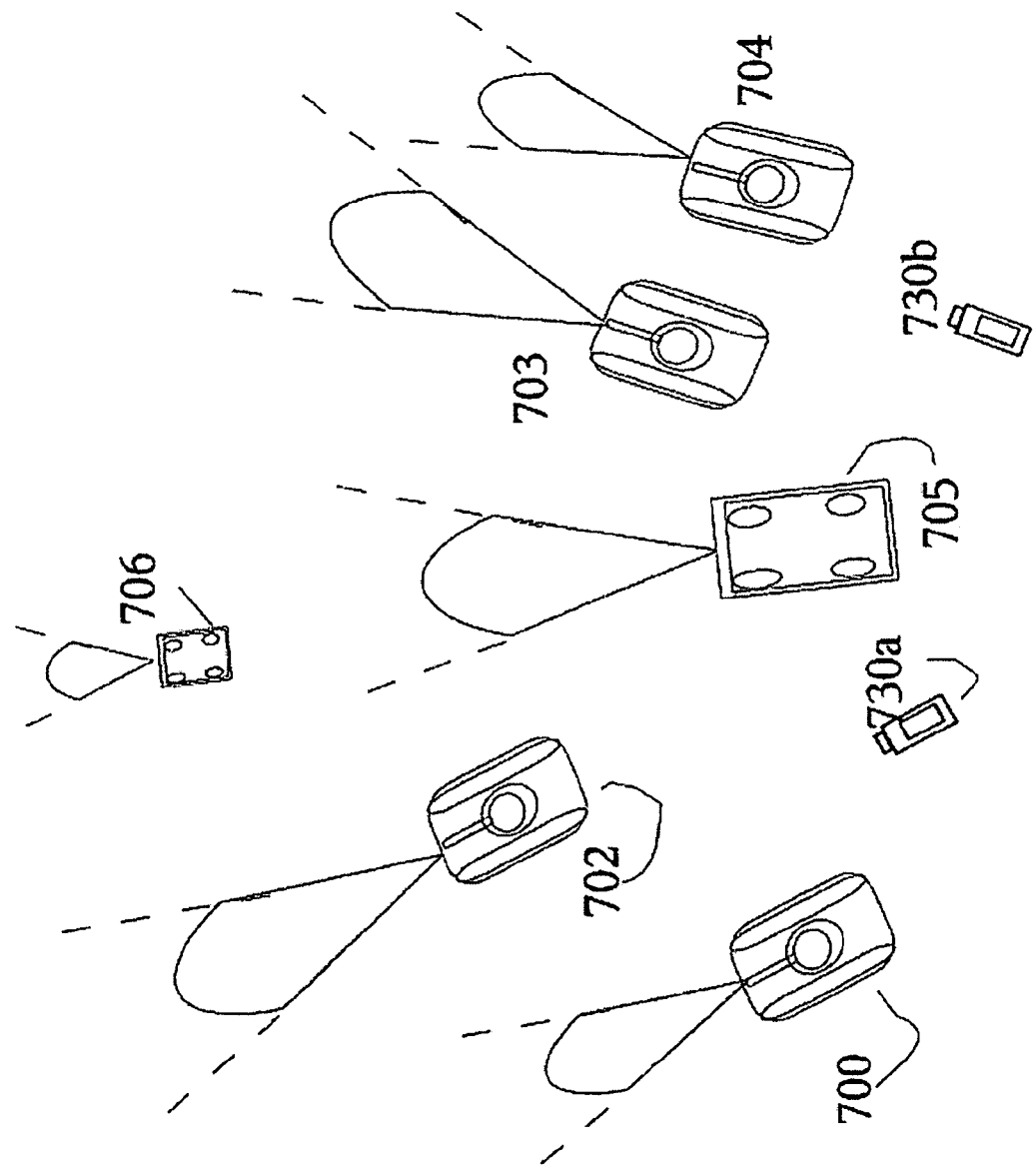
FIG. 6 is a plan view illustrating the use of the instant invention for the command and control of a variety of combat vehicle executing a mission was spreading out over the terrain

FIG. 6 is a plan view illustrating the use of the instant invention for the command and control (optionally from vehicle 705) of a variety of combat vehicles 700-704 executing a mission while spreading out over the terrain. Alternative virtual camera positions 730a and 730b allow a wide-angle view of the battlefield from any vehicle, with the images being acquired from manned vehicles 700-705 or drones 706. The image preferably shows the actual view from each vehicle, identifies "friend" and "foe" with additional icons thus avoiding friendly fire accidents.

It should be appreciated that the images described and combined need not be solely from visual sources, but include IR, NIR and other non-visual sources, and may combine visual images with non-visual or enhanced images in either monoscopic or stereoscopic views in the final composite images.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims. For example, it should be appreciated that the alternative methods of forming a composite image disclosed herein can be combined with any of the prior art methods of digital image processing provided the real-time images are either acquired in digital format or converted to digital format from an analog video recorder or camera.

The invention claimed is:

1. A method for displaying a composite image of alternative vantage points, comprising the steps of:
   acquiring a first image from an image acquisition device;
   acquiring a second image from the image acquisition device;
   generating a first vantage point image and a second vantage point image by transforming the first image and the second image, respectively,
      wherein transforming the first and second images into the first and second vantage point images comprises transforming each row of the x axis gradually with increased compression starting from the upper edge of the frame with increasing compression towards the bottom of the frame;
   scaling the second vantage point image based on at least one of a scaling factor, an x axis, and a y axis displacement; and
   creating a composite image by overlaying the scaled second vantage point image onto the first vantage point image.

2. The method of claim 1, further comprising acquiring the first image from an image database.

3. The method of claim 1, wherein the second image is a real time image captured after the first image following movement or displacement of the image acquisition device.

4. The method of claim 1, wherein transforming the first image and the second image comprises generating a bird's-eye view of the first image and the second image using techniques comprising image compression, converting forward-looking video or motion picture imagery into a down-looking image database, or geo-spatial registration.

5. The method of claim 1, wherein scaling the second vantage point image is performed based in part on a trapezoidal shape.

6. A method for displaying a composite image of alternative vantage points viewed from a vehicle, comprising the steps of:
   acquiring a first image from an image acquisition device associated with a vehicle;

acquiring a second image from the image acquisition device, wherein the second image is captured after the first image following movement or displacement of the image acquisition device;

generating a first vantage point image and a second vantage point image by transforming the first image and the second image, respectively, wherein transforming the first and second images into the first and second vantage point images comprises transforming each row of the x axis gradually with increased compression starting from the upper edge of the frame with increasing compression towards the bottom of the frame;

scaling the second vantage point image based on at least one of a scaling factor, an x axis, a y axis, and a z axis displacement of the vehicle; and creating a composite image by overlaying the scaled second vantage point image onto the first vantage point image.

7. The method of claim 6, further comprising acquiring a first image from an image database.

8. The method of claim 6, wherein transforming the first image and the second image comprises generating a bird's-eye view of the first image and the second image using techniques comprising image compression, converting forward-looking video or motion picture imagery into a down-looking image database, or geo-spatial registration.

9. The method of claim 6, further comprising generating the scaled second vantage point image based on a de-magnification factor, wherein the de-magnification factor is based on the y axis displacement of the vehicle between the acquisition of the first image and the second image.

10. The method of claim 6, wherein the composite image includes a synthesized image of the vehicle.

11. The method of claim 6, wherein the composite image comprises various indicia, including road markings, road hazards, and intended driving route.

12. The method of claim 6, wherein the composite image is refreshed in real time based on the forward progress of the vehicle.

13. The method of claim 6, wherein creating the composite image by overlaying the scaled second vantage point image onto the first vantage point image comprises the steps of:

merging the first vantage point image with the scaled second vantage point image based on a lateral translation and a rotation of the image acquisition device between acquisition of the first image and the second image; and mapping a displacement of pixels from the first vantage point image to the scaled second vantage point image by replacing a sub group of pixels associated with the first vantage point image with the scaled second vantage point image.

14. A method for displaying a composite image of alternative vantage points viewed from a plurality of vehicles, comprising the steps of:

acquiring a plurality of first images from a plurality of image acquisition devices associated with each of a plurality of vehicles;

acquiring a plurality of second images from the plurality of image acquisition devices, wherein the plurality of second images are captured after the plurality of first images;

generating a plurality of first vantage point images and a plurality of second vantage point images by transforming the plurality of first images and the plurality of second images, respectively, wherein transforming the first and second images into the first and second vantage point images comprises transforming each row of the x axis gradually with increased compression starting from the upper edge of the frame with increasing compression towards the bottom of the frame;

scaling the plurality of second vantage point images based on at least one of a scaling factor, an x axis, a y axis, and a z axis displacement of the vehicle; and creating a composite display by overlaying the plurality of scaled second vantage point images onto the plurality of first vantage point images, wherein the composite display is accessible from each of the plurality of vehicles.

15. A system for displaying a composite image of alternative vantage points comprising:

an image acquisition device for acquiring a first image and a second image;

an image processor for performing the steps comprising:

generating a first vantage point image and a second vantage point image by transforming the first image and the second image, respectively, wherein transforming the first and second images into the first and second vantage point images comprises transforming each row of the x axis gradually with increased compression starting from the upper edge of the frame with increasing compression towards the bottom of the frame;

scaling the second vantage point image based on at least one of a scaling factor, an x axis, and a y axis displacement; and creating a composite image by overlaying the scaled second vantage point image onto the first vantage point image.

16. The system of claim 15, further comprising an image database for generating a first image.

17. The system of claim 15, wherein the second image is a real time image captured after the first image following movement or displacement of the image capturing device.

18. A system for displaying a composite image of alternative vantage points viewed from a plurality of vehicles comprising:

a plurality of image acquisition devices associated with each of a plurality of vehicles for acquiring a plurality of first images and a plurality of second images, wherein the plurality of second images are captured after the plurality of first images; and an image processor for performing the steps comprising:

generating a plurality of first vantage point images and a plurality of second vantage point images by transforming the plurality of first images and the plurality of second images, respectively, wherein transforming the first and second images into the first and second vantage point images comprises transforming each row of the x axis gradually with increased compression starting from the upper edge of the frame with increasing compression towards the bottom of the frame;

scaling the plurality of second vantage point images based on at least one of a scaling factor, an x axis, a y axis, and a z axis displacement of the vehicle; and creating a composite image by overlaying the plurality of scaled second vantage point images onto the plurality of first vantage point images, wherein the composite image is accessible from each the plurality of vehicles.

* * * * *